United States Patent
Tunoda (10) Patent No.: US 7,420,593 B2
(45) Date of Patent: Sep. 2, 2008

(54) ELECTRONIC CAMERA UTILIZING PIXEL BLOCKS

(75) Inventor: Hirosi Tunoda, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 443 days.

(21) Appl. No.: 10/532,337

(22) PCT Filed: Sep. 3, 2003

(86) PCT No.: PCT/JP03/11278

§ 371 (c)(1),
(2), (4) Date: Apr. 22, 2005

(87) PCT Pub. No.: WO2004/039073

PCT Pub. Date: May 6, 2004

(65) Prior Publication Data

US 2006/0061667 A1    Mar. 23, 2006

(30) Foreign Application Priority Data

Oct. 23, 2002 (JP) .............................. 2002-308530

(51) Int. Cl.
 *H04N 5/228* (2006.01)
(52) U.S. Cl. .............................. 348/222.1; 375/240.17; 345/614; 345/615
(58) Field of Classification Search .............. 348/222.1, 348/279, 308, 281, 277, 231.99
See application file for complete search history.

(56) References Cited

U.S. PATENT DOCUMENTS 7,181,092 B2 * 2/2007 Tsukioka ..................... 382/312
2001/0036359 A1 * 11/2001 Nishikawa et al. .......... 386/109

FOREIGN PATENT DOCUMENTS

| JP | 5-110979 A | 4/1993 |
| JP | 2001-223921 A | 8/2001 |
| JP | 2001-231003 A | 8/2001 |

* cited by examiner

*Primary Examiner*—Tuan V Ho
*Assistant Examiner*—Amy Hsu
(74) *Attorney, Agent, or Firm*—Arent Fox LLP (57) ABSTRACT

A mobile communication terminal comprises a camera unit (34) and a main CPU. In the camera unit (34), a processing system including a color conversion circuit (66) and an image compression circuit (68) generates high-resolution compressed still image data based on interpolated image data of a photographed object. Also, a processing system including an image decompression circuit (74), a color conversion circuit (72), and a thinning-out circuit (70) generates low-resolution decompressed still image data based on the high-resolution compressed still image data. The main CPU activates an image compression circuit (68) when a release key is operated, and activates an image decompression circuit (74) when generation of the compressed still image data is completed. The low-resolution decompressed image data generated by activation of the image decompression circuit (74) is obtained by the main CPU from the camera unit and written into a VRAM. As a result, a decompressed image is displayed on an LCD.

7 Claims, 8 Drawing Sheets

RAW IMAGE DATA

FIG. 5 (B)

INTERPOLATED IMAGE DATA

ELECTRONIC CAMERA UTILIZING PIXEL BLOCKS

CROSS-REFERENCE TO RELATED APPLICATION

This application is a National Stage entry of International Application No. PCT/JP03/11278, filed Sep. 3, 2003. The disclosure of the prior application is hereby incorporated herein in it entirety by reference.

TECHNICAL FIELD

The present invention relates to an electronic camera. More specifically, the present invention relates to an electronic camera which is applied to a mobile communication terminal and comprises a camera device and a processor.

PRIOR ART

One example of a conventional electronic camera is disclosed in Japanese Patent Laying-open No. 2001-231003 laid-open on Aug. 24, 2001. According to the prior art, an image signal of an object photographed in response to an operation of a shutter button is temporarily stored in a frame memory, and then recorded on a recording medium after subjected to signal processings such as YUV conversion and JPEG compression. The image signal stored in the frame memory is also output to a monitor after subjected to YUV conversion and thinning-out process, and therefore a still image (freeze image) of the photographed object is displayed on a monitor screen.

However, the JPEG compression is lossy compression and thus may cause some quality deterioration in a decompressed image. Meanwhile, the freeze image displayed on the monitor screen is not an image that has been subjected to compression process and extension process. Because of this, in the prior art it is impossible to identify from the freeze image the image quality deterioration appeared on the decompressed image, and the checking of image quality deterioration requires a shift to a reproduction mode. In the prior art, consequently, a complicated operation is needed to check a photographed image for image quality deterioration.

SUMMARY OF THE INVENTION

Therefore, it is a primary object of the present invention to provide an electronic camera which makes it possible to easily and promptly check a photographed image for image quality deterioration.

According to the present invention, an electronic camera comprises a camera device and a processor. The camera device comprises a first generation means for generating a compressed image signal based on a photographed image signal, and a second generation means for generating a decompressed image signal based on the compressed image signal generated by the first generation means. The processor comprises a first activation means for activating the first generation means in response to a photographing instruction, a second activation means for activating the second generation means in response to completion of a generation process by the first generation means, and an output means for outputting to a monitor the decompressed image signal generated by the second generation means.

In the camera device, the first generation means generates a compressed image signal based on a photographed image signal, and the second generation means generates a decompressed image signal based on the compressed image signal. The processor activates the first generation means in response to a photographing instruction, and activates the second generation means in response to the completion of the generating process by the first generation means. The processor also outputs toward the monitor the decompressed image signal generated by the second generation means.

That is, when a photographing instruction is provided, a compressed image signal is generated on the basis of a photographed image signal, and when the compressed image signal is generated, a decompressed image signal is generated on the basis of the compressed image signal. The decompressed image signal generated in this way is output to the monitor. This makes it possible to check the decompressed image for image quality deterioration in an easy and prompt manner.

It is preferable that the processor temporarily stores in the memory the compressed image signal generated by the first generation means, and records the compressed image signal on a recording medium in response to a recording instruction. This avoids unintended recording of an image of insufficient image quality, resulting in an improvement of operability.

In the first generation means, if a compression means compresses the photographed image signal in a specific order, the camera device preferably comprises an image sensor in which a plurality of light-receiving elements for generating electric charges corresponding to an optical image of an object are formed, and a reading means for reading the electric charges generated in the plurality of light-receiving elements in an order correlating with the specific order. As a consequence, it becomes no longer necessary to store the photographed image signal in the memory prior to compression, which allows a reduction in memory capacity.

Preferably, the compression means performs compression in units of a first pixel block and the reading means performs reading in units of a second pixel block correlating with the first pixel block. More preferably, the camera device further comprises a color filter arranged on a front surface of the image sensor and having a plurality of colors of color elements, and a color separation means for subjecting to color separation electric charge signals each of which has only color information of one of the plurality of colors. The second pixel block is larger than the first pixel block, and two second pixel blocks adjacent to each other are partly overlapping. It is noted that, if the image sensor is a CMOS type, the reading of electric charges as stated above becomes possible.

In the second generation means, if a decompression means subjects the compressed image signal to a decompression process and a resolution reduction means reduces a resolution of the image signal decompressed by the decompression means to generate the above stated decompressed image signal, a memory for temporarily storing the decompressed image signal of high resolution becomes unnecessary.

The compression means preferably performs compression in a lossy format. In such a case, some image quality deterioration occurs in the decompressed image.

In addition, the photographed image signal is preferably a still image signal. Since image quality deterioration in a still image is more prominent than image quality deterioration in a moving image, it can be said that a more remarkable effect will take place in case where the above described process is performed on a still image signal.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 (A) is an illustrative view showing one part of an operation of the FIG. 3 embodiment;

FIG. 5 (B) is an illustrative view showing one part of an operation of the FIG. 3 embodiment;

BEST MODE FOR PRACTICING THE INVENTION

Figure 1:
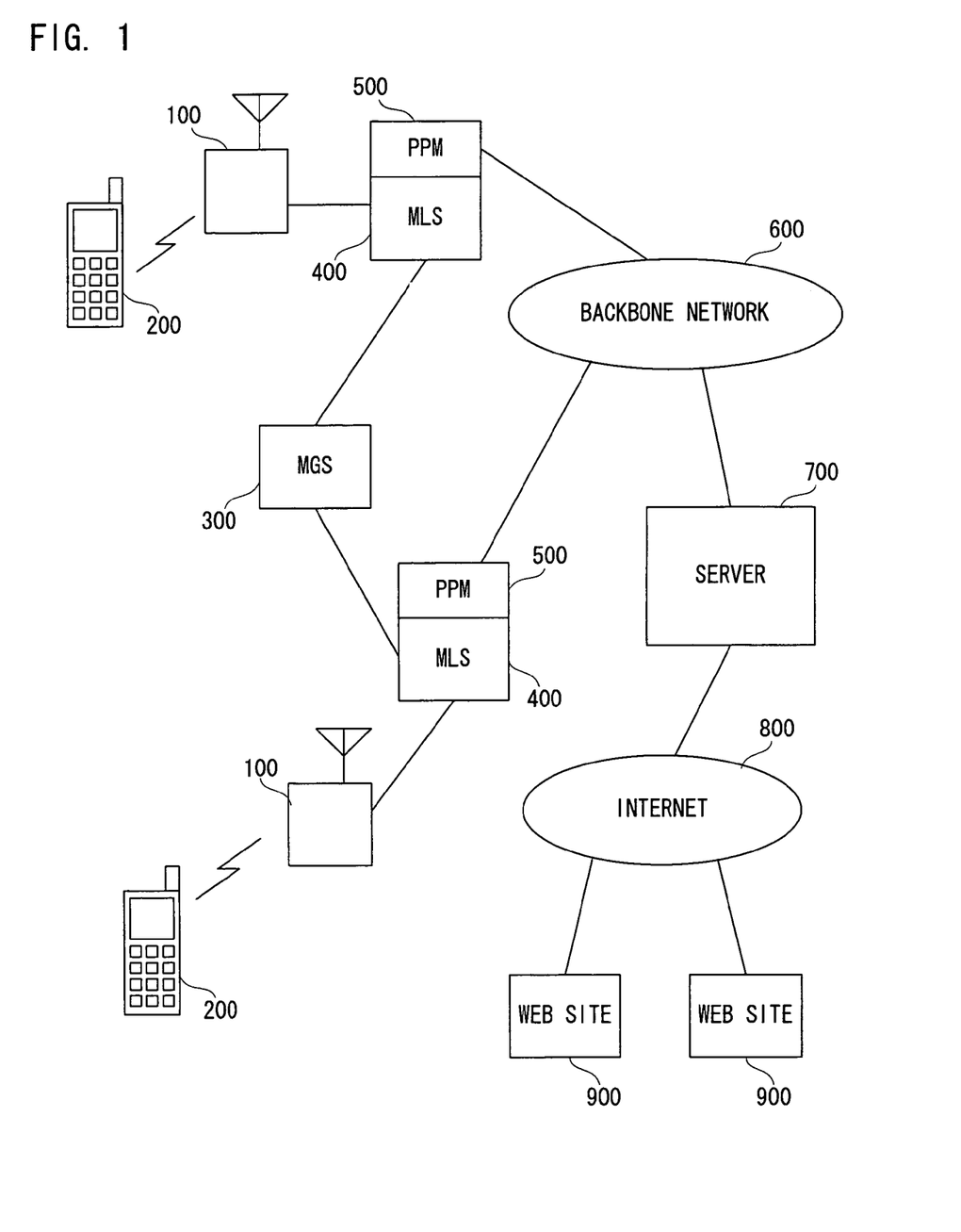
FIG. 1 is a block diagram showing one embodiment of the present invention.

Referring to FIG. 1, a mobile communication system of this embodiment includes a mobile communication terminal 200 and a plurality of BS's (Base Stations) 100, 100, . . . for performing wireless communications. The BS 100 is connected with an MLS (Mobile Local Switch) 400. The MLS 400 is connected to another MLS 400 via an MGS (Mobile Gateway Switch) 300. Telephone dialogues, that is, audio data communications between the mobile communication terminals 200 are carried out via the BS 100, the MLS 400 and the MGS 300.

The MLS 400 is also connected to a backbone network 600 via a PPM (Packet Processing Module) 500. The backbone network 600 is connected with a server 700. The server 700 is connected to the Internet 800 as well.

When the mobile communication terminal 200 transmits packet data, the packet data is provided to the server 700 via the BS 100, the MLS 400, the PPM 500 and the backbone network 600. If the transferred packet data is a mail addressed to another mobile communication terminal 200, the server 700 sends the packet data to the mobile communication terminal 200 of destination via the backbone network 600, the PPM 500, the MLS 400, and the BS 100. On the other hand, if the transferred packet data is a request for access to a web site 800, the server 700 accesses the web site 900 via the Internet 800, and returns packet data obtained from the access destination to the mobile communication terminal 200 that is a source of the request. In this case as well, the packet data is transferred to the mobile communication terminal 200 that is the source of the request, via the backbone network 600, the PPM 500, the MLS 400, and the BS 100.

Figure 2:
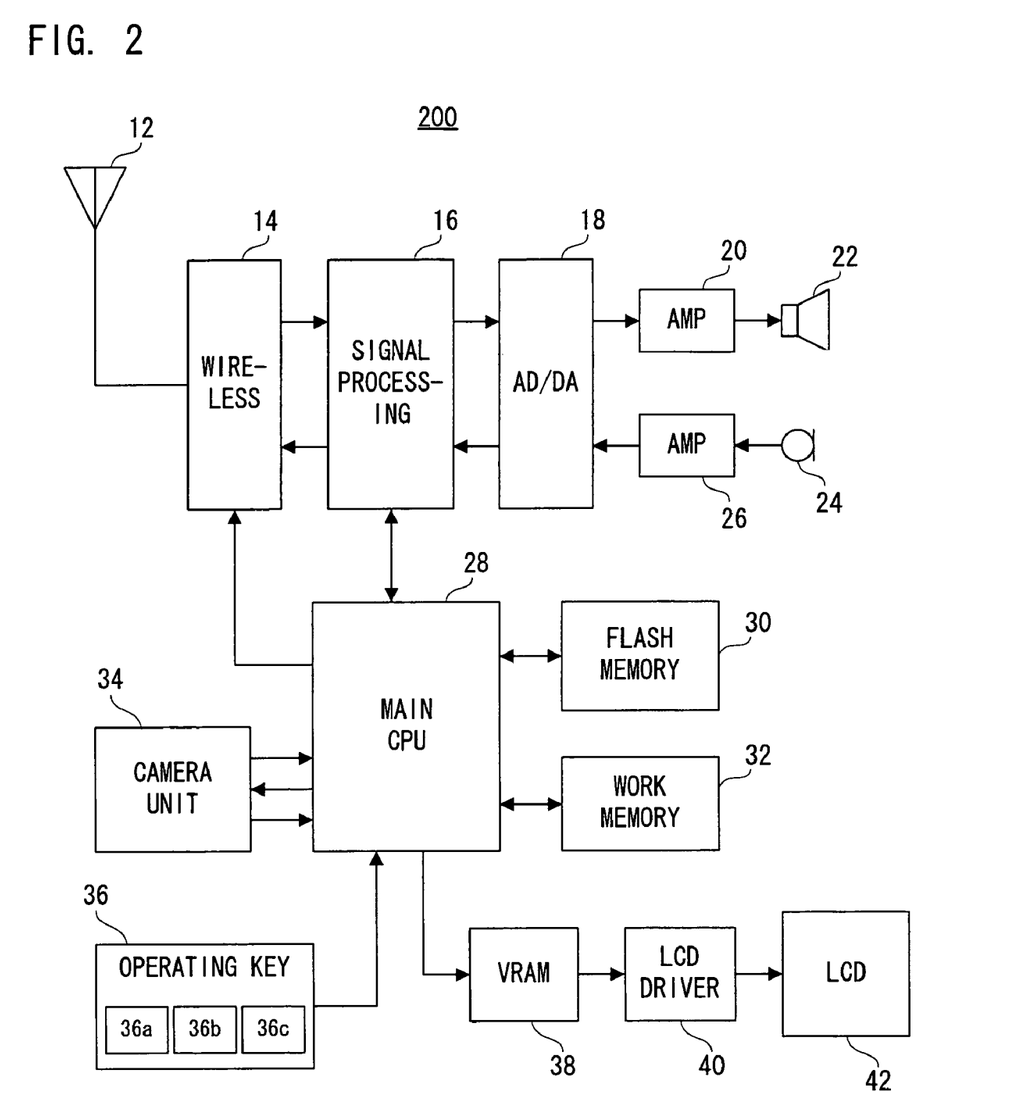
FIG. 2 is a block diagram showing one example of a structure of a mobile communication terminal applied to the FIG. 1 embodiment.

More specifically, the mobile communication terminal 200 is structured as shown in FIG. 2. When a call-out operation for telephone conversation is performed by an operating key 36, a main CPU 28 transmits a call-out signal to the mobile communication terminal 200 of the other party through a signal processing circuit 16, a wireless circuit 14 and an antenna 12. When the other party performs a call-in operation in response to this, a telephone conversation becomes available.

When a voice is input into a microphone 24 after a telephone conversation has become available, the voice is converted by the microphone 24 into an audio signal as an analog signal. The converted audio signal is amplified by an amplifier 26 and converted by an AD/DA conversion circuit 18 into audio data as a digital signal. The converted audio data is subjected to an encoding process by the signal processing circuit 16, and also subjected to a modulation process by the wireless circuit 14. The modulated audio data generated by the wireless circuit 14 is transmitted from the antenna 12.

On the other hand, modulated audio data transmitted from the other party is received by the antenna 12, subjected to a demodulation process by the wireless circuit 14, and subjected to a decoding process by the signal processing circuit 16. The audio data decoded by the signal processing circuit 16 is converted by the AD/DA conversion circuit 18 into an audio signal as an analog signal. The converted audio signal is output from a speaker 22 via an amplifier 20.

In the middle of a conversation with the other party in this manner, if a conversation end operation is performed by the operating key 36, the main CPU 28 controls the signal processing circuit 16 and the wireless circuit 14 to transmit a conversation end signal to the other party. After transmission of the conversation end signal, the main CPU 28 ends the conversation process. In case where a conversation end signal is firstly received from the other party as well, the main CPU 28 ends the conversation process.

When a camera function is enabled by the operating key 36 in a state of no conversation being held, a through image output process is carried out by the camera unit 34 and the main CPU 28. Firstly, the camera unit 34 photographs an object, generates low-resolution moving image data corresponding to the photographed object, and outputs the generated moving image data to the main CPU 28. The main CPU 28 transfers the moving image data output from the camera unit 34 to a VRAM 38. The moving image data stored in the VRAM 38 is read out by an LCD driver 40, and thus a real-time moving image (through image) of the object is displayed on the LCD 42.

When a release key 36a provided in the operating key 36 is operated, an image compression/save process is carried out by the camera unit 34 and the main CPU 28. In first, the camera unit 34 generates high-resolution compressed still image data corresponding to the object at a time when the release key 36a is operated, and outputs the generated compressed still image data to the main CPU 28. The main CPU 28 temporarily saves in a work memory 34 the compressed still image data supplied from the camera unit 34.

Upon completion of the image compression/save process, a decompressed image output process is performed. The camera unit 34 firstly decompresses the compressed still image data in the JPEG format, reduces a resolution of the decompressed still image data, and outputs the low-resolution decompressed still image data to the main CPU 28. The main CPU 28 writes the decompressed still image data output from the camera unit 34 into the VRAM 38. The decompressed still image data stored in the VRAM 38 is read out by the LCD driver 40, and thus the LCD 42 displays the still image (freeze image) of the object at a time when the release key 36a is operated.

Since the JPEG format is a lossy format, some image quality deterioration appears on the decompressed still image data. Accordingly, this image quality deterioration is also reflected in the freeze image displayed on the LCD 42. An operator can easily and promptly identify the image quality deterioration from the displayed freeze image.

If a recording key 36b is operated after display of the freeze image on the LCD 42, the main CPU 28 performs a recording process. More specifically, the compressed still image data saved in the work memory 34 is recorded by the main CPU 28 on a flash memory 30. A data file containing the compressed still image is formed in the flash memory 30 is formed with. Upon completion of recording, the through image output process is resumed.

Additionally, if a cancel key 36c is operated instead of the recording key 36b, the through image output process is resumed, bypassing the compressed image data recording process.

When a mail transmission function is enabled, the main CPU 28 requests the operator to input a destination address, title and message and select arbitrary compressed still image data from the flash memory 30. When the destination address, title and message are input and the arbitrary compressed still image data is selected by operation of the operating key 36, the main CPU 28 prepares a mail and transmits the mail through the signal processing circuit 16, the wireless circuit 14 and the antenna 12.

It is noted that a program for realizing the above stated camera function can be downloaded from a specific web site 900 existing on the Internet 900. The program downloaded here is written into the flash memory 30.

Figure 3:
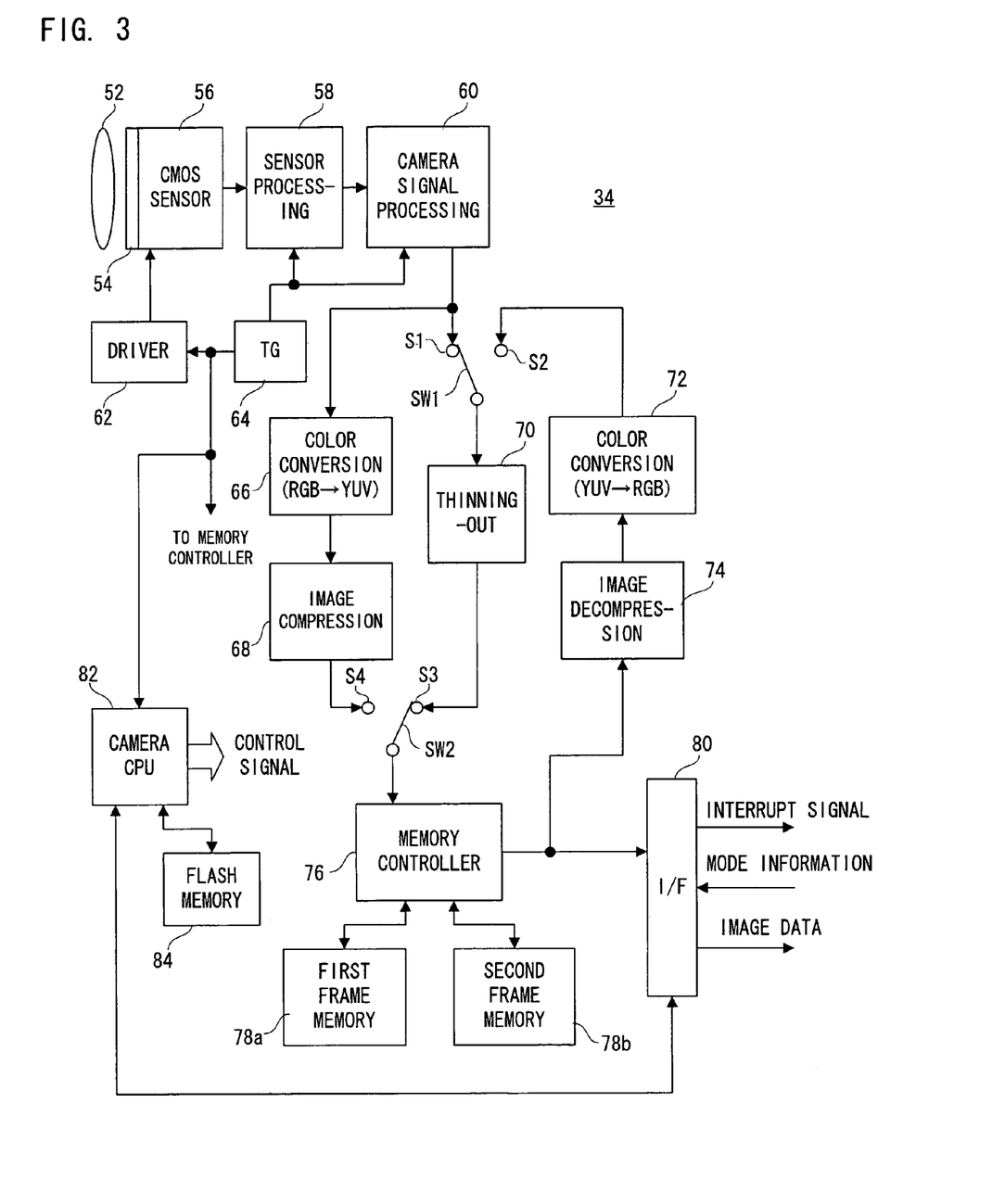
FIG. 3 is a block diagram showing one example of a structure of a camera unit applied to the FIG. 2 embodiment.
Figure 4:
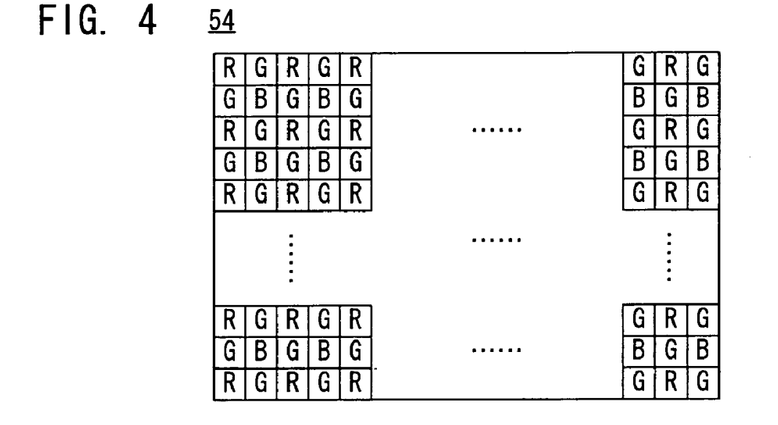
FIG. 4 is an illustrative view showing one example of a structure of a color filter applied to the FIG. 3 embodiment.

The camera unit 34 is more specifically structured as shown in FIG. 3. An optical image of the object is irradiated onto a light-receiving surface of a CMOS-type image sensor 56 through an optical lens 52 and a color filter 54 having a Bayer pattern as shown in FIG. 4. Color elements forming the color filter 54 correspond one by one to the light-receiving elements (pixels) formed on the light-receiving surface of the image sensor 56. Generated in each light-receiving element are electric charges having only one of color information R, G and B.

At a time of the through image output process, a driver 62 drives the image sensor 56 in a raster-scanning mode in response to a vertical synchronizing signal output from a TG (Timing Generator) 64. The image sensor 56 outputs a raw image signal composed of the above mentioned electric charges one line by one line. A sensor processing circuit 58 generates raw image data as a digital signal by subjecting a raw image signal of each frame output from the image sensor 56 to such processes as CDS, AGC, A/D compression, etc. A camera signal processing circuit 60 generates interpolated image data by subjecting the generated raw image data to such processes as white-balance adjustment, color separation, etc. Each of the pixels forming the interpolated image data is supposed to have all color information of R, G and B. Additionally, the sensor processing circuit 58 and the camera signal processing circuit 60 perform the processes in response to a clock signal output from the TG 64.

At the time of the through image output process, a switch SW1 is connected to a terminal S1 and a switch SW2 is connected to a terminal S3. The interpolated image data output from the camera signal processing circuit 60 is provided to a thinning-out circuit 70 via the switch SW1, and subjected to a resolution reduction process. The thinning-out circuit 70 outputs low-resolution interpolated image data. The interpolated image data is provided to a memory controller 76 via the switch SW2.

At the time of the through image output process, the memory controller 76 performs so-called bank switching in response to the vertical synchronizing signal output from the TG 64. More specifically, in writing into a first memory 78a a current frame of interpolated image data supplied from the switch SW2, the memory controller 76 reads out a previous frame of interpolated image data from a second frame memory 78b. In writing into a second frame memory 78b the current frame of interpolated image data supplied from the switch SW2, the memory controller 76 reads out the previous frame of the interpolated image data from the first frame memory 78a. Therefore, no overtaking will occur between a read address and a write address. The consecutive frames of interpolated image data, that is, the moving image data read by the memory controller 76 are output to the main CPU 28 via an I/F 80.

Figure 5:
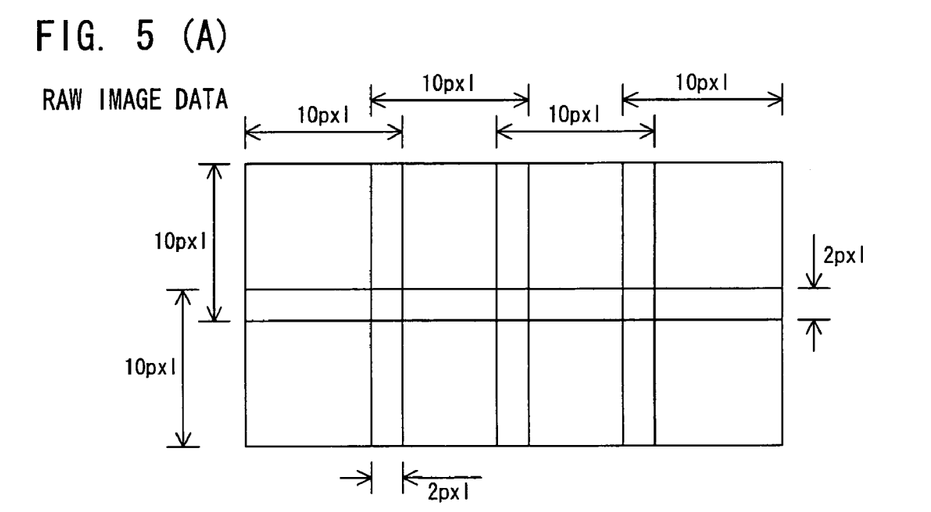

At the time of the image compression/save process, the driver 62 drives the image sensor 56 for a one-frame period in a block-scanning mode. This causes the image sensor 56 to output one frame of raw image signal in units of pixel blocks each of which is formed from 10 horizontal pixels×10 vertical pixels. At this time, an overlap of two pixels occurs between the pixel blocks adjacent to each other as shown in FIG. 5(A). This overlap allows for a color separation process in the camera signal processing circuit 60.

The raw image signal output from the image sensor 56 is converted by the sensor processing circuit 58 into raw image data. The raw image data output from the sensor processing circuit 58 is converted by the camera signal processing circuit 60 into interpolated image data. The interpolated image data is output from the camera signal processing circuit 60 in units of pixel blocks each of which is formed from 8 pixels×8 pixels as shown in FIG. 5(B).

At the time of the image compression/save process, the switch SW1 is connected to a terminal S2 and the switch SW2 is connected to a terminal S4. Also, a compression instruction is provided to an image compression circuit 68, and a bank fixing instruction is provided to the memory controller 76. By the bank fixing instruction, the first frame memory 78a is designated as a writing destination and reading destination.

Each pixel block of interpolated image data output from the camera signal processing circuit 60 is provided to a color conversion circuit 66. A color format of the interpolated image data is converted from an RGB format to a YUV format. The converted interpolated image data is supplied in pixel blocks to the image compression circuit 68 which is activated by the compression request, and is subjected to a compression process in a lossy format such as JPEG.

The compressed interpolated image data, that is, the compressed still image data is provided to the memory controller 76 via the switch SW2, and thereby written into the first frame memory 78a. Since the first frame memory 78a is also designated as a reading destination, the compressed still image data stored in the first frame memory 78a is read out later by the memory controller 76. The read compressed still image data is output to the main CPU 28 via the I/F 80.

At a time of the decompressed image output process, a decompression instruction is provided to an image decompression circuit 74 and a setting change instruction is provided to the memory controller 76. By the setting change instruction, the first frame memory 78a is designated as a reading destination and the second frame memory 78b is designated as a writing destination. The memory controller 76 reads out the compressed still image data from the first frame memory 78a, and the image compression circuit 74 activated by the decompression instruction subjects the read compressed still image data to a JPEG decompression. The decompression process is performed in pixel blocks, and each pixel block of decompressed interpolated image data, that is, decompressed still image data is subjected by a color conversion circuit 72 to color conversion from the YUV format to the RGB format.

The switch SW1 is connected with the terminal S2 at this point in time, and the decompressed still image data output from the color conversion circuit 72 is supplied to the thinning-out circuit 70 via the switch SW1. The thinning-out circuit 70 subjects the supplied compressed still image data to a resolution reduction process, and the resulting low-resolution decompressed still image data is input to the memory controller 76 via the switch SW2. The memory controller 76 writes the input decompressed still image data into the second frame memory 78b.

When the decompression process for one frame has been completed by the image decompression circuit 74, a setting change instruction is provided to the memory controller 76. By this instruction, the second frame memory 78b is designated as a reading destination. The memory controller 76 reads out the decompressed still image data from the second frame memory 78b, and outputs the read decompressed still image data to the main CPU 28 via the I/F 80.

Figure 6:
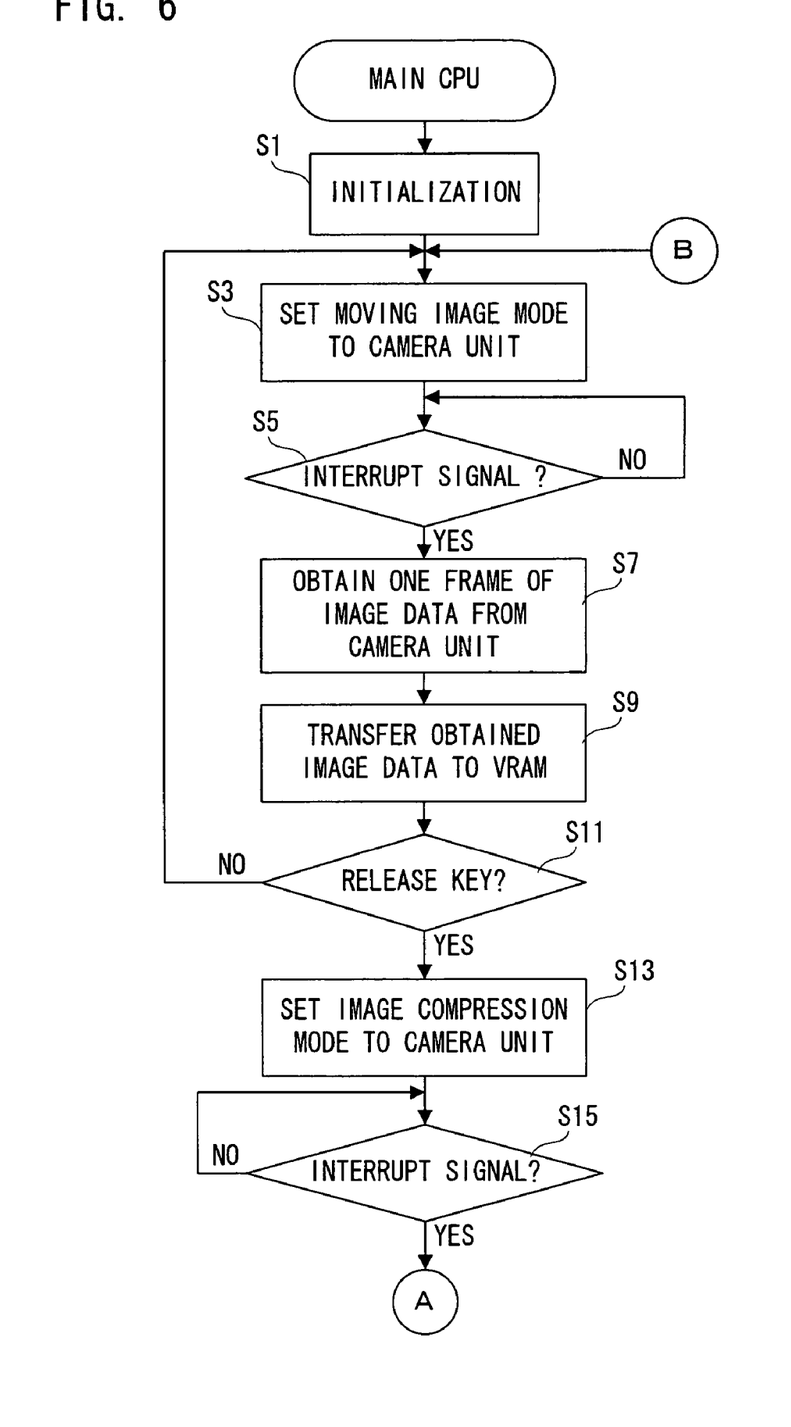
FIG. 6 is a flowchart showing one part of an operation of a main CPU applied to the FIG. 2 embodiment.
Figure 7:
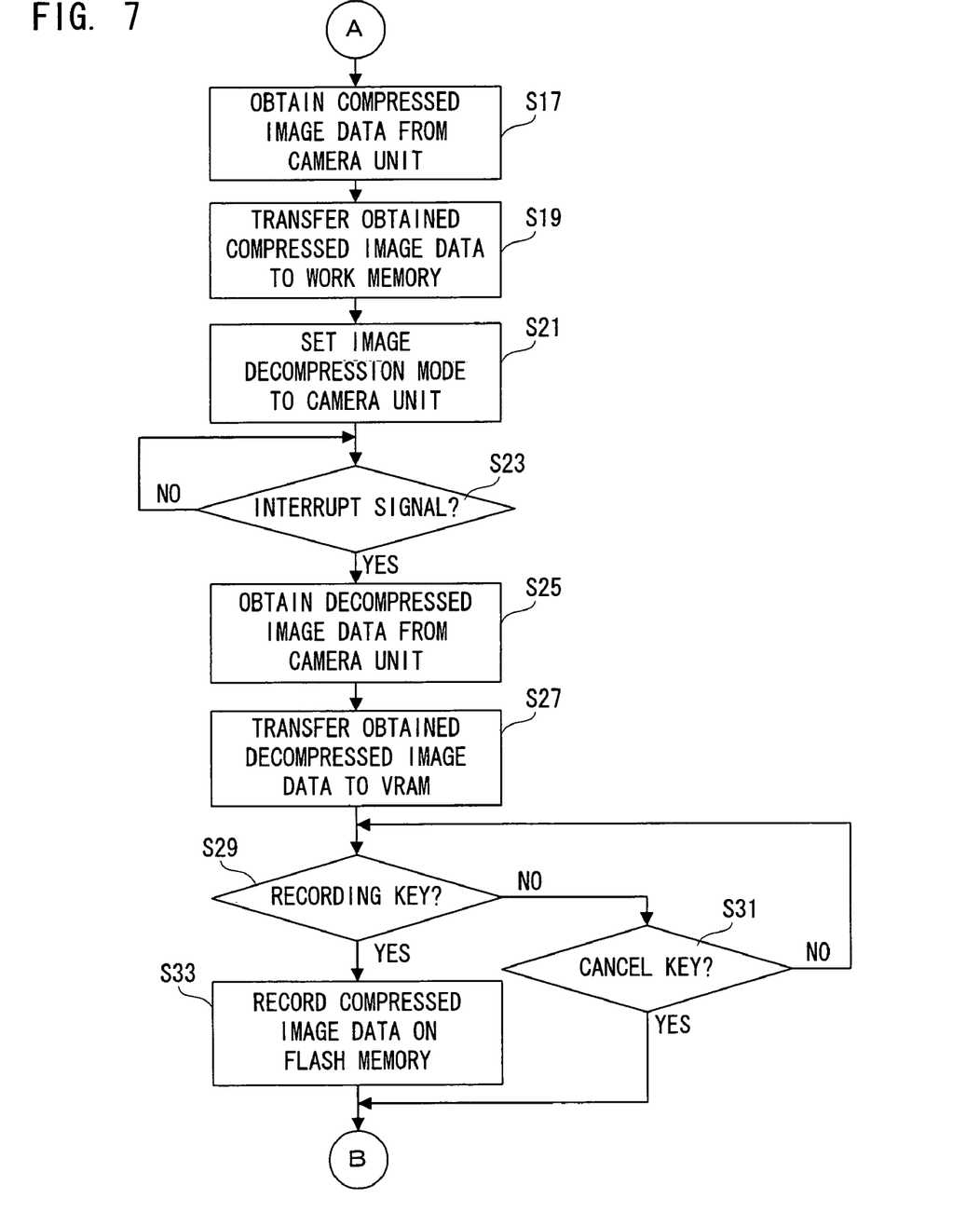
FIG. 7 is a flowchart showing another part of the operation of the main CPU applied to the FIG. 2 embodiment.
Figure 8:
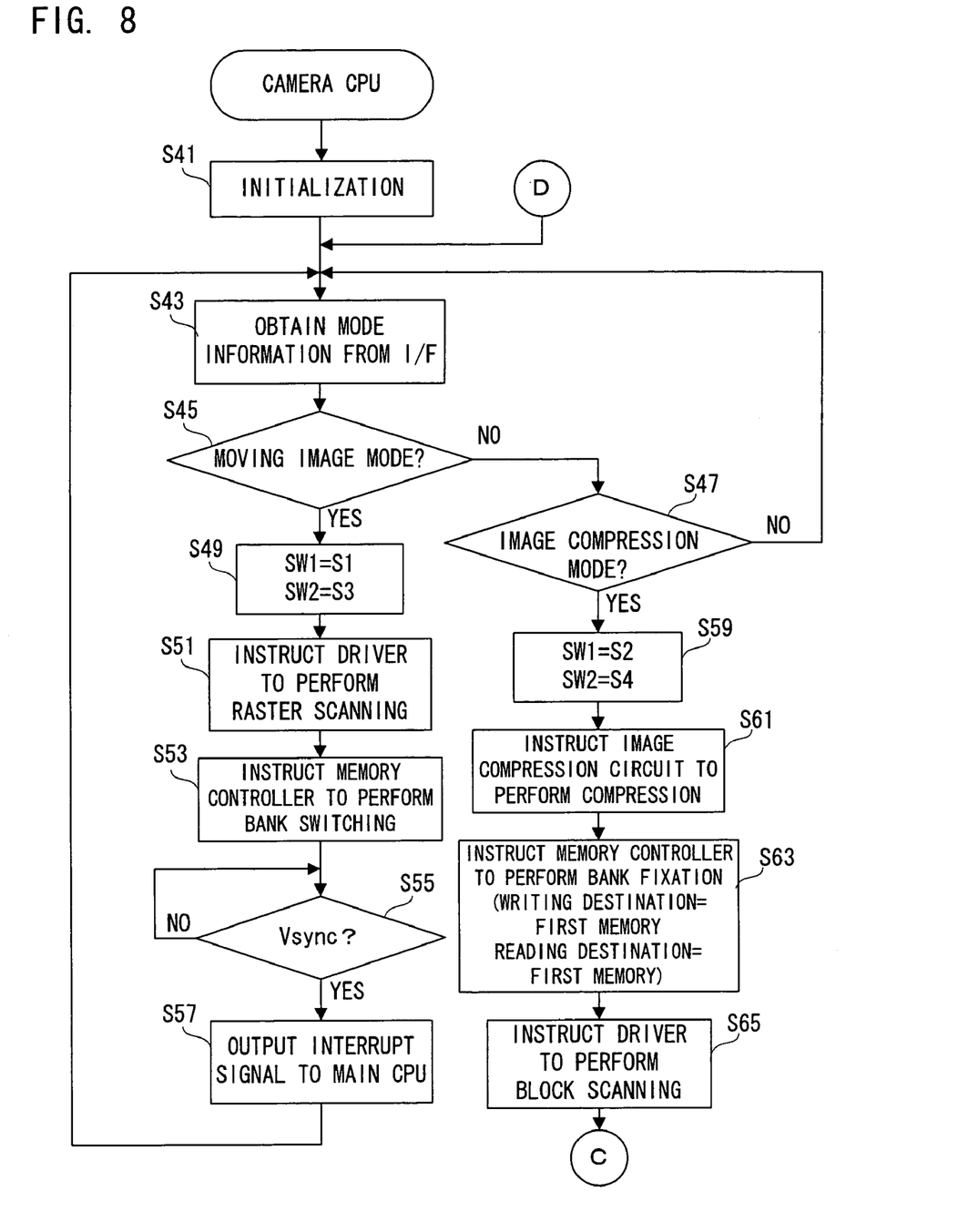
FIG. 8 is a flowchart showing one part of an operation of a camera CPU applied to the FIG. 3 embodiment.
Figure 9:
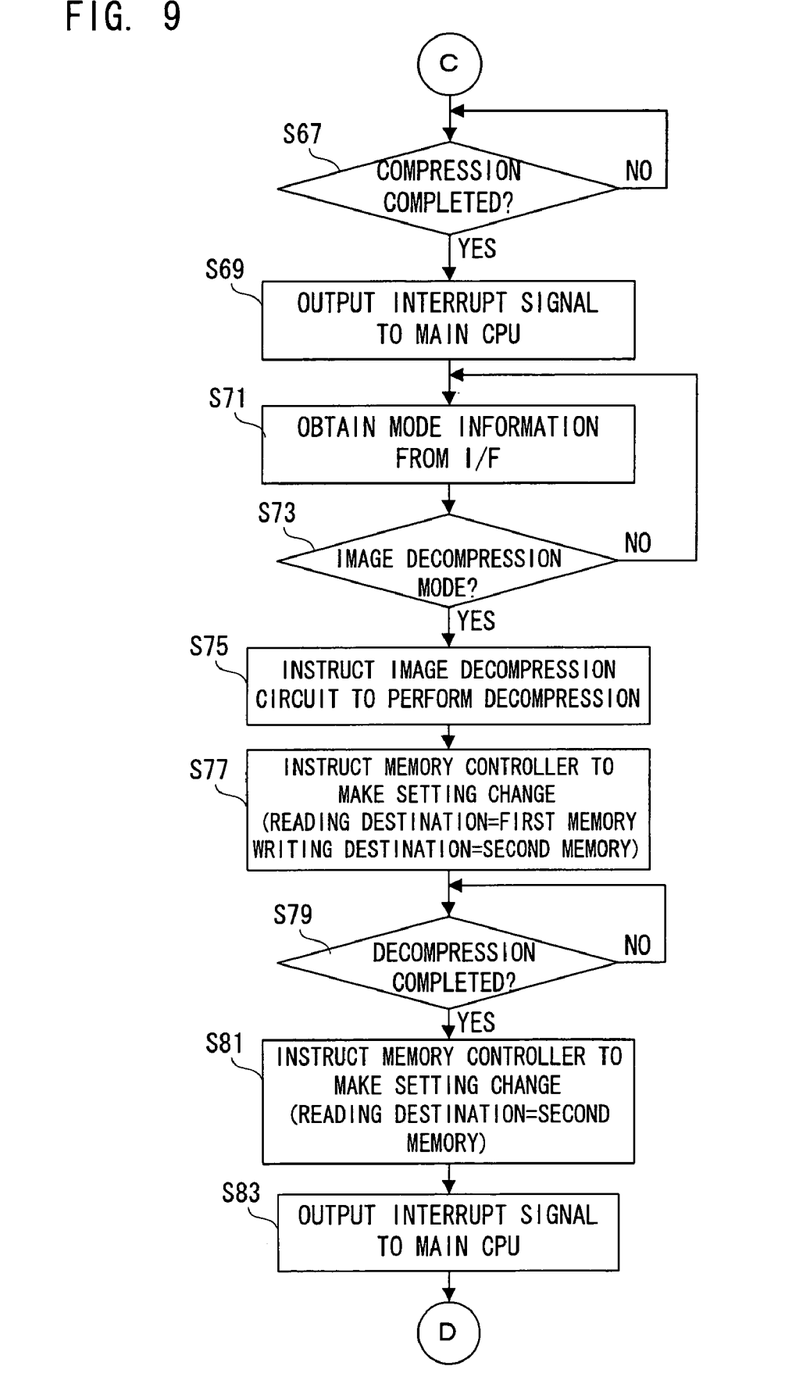
FIG. 9 is a flowchart showing another part of the operation of the camera CP applied to the FIG. 3 embodiment.

When the camera function is enabled, the main CPU 28 performs a process according to flowcharts shown in FIG. 6 and FIG. 7, and a camera CPU 78 performs a process according to flowcharts shown in FIG. 8 and FIG. 9. In addition, a control program corresponding to the flowcharts shown in FIG. 6 and FIG. 7 is stored in the flash memory, and a control program corresponding to the flowcharts shown in FIG. 8 and FIG. 9 is stored in a flash memory 84.

Referring to FIG. 6 and FIG. 7, a description will be firstly presented as to a process of the main CPU 28. In a step S1, a prescribed initialization process is carried out. In a succeeding step S3, a moving image mode is set to the camera unit 34 so as to perform the through image output process. More specifically, mode information indicating "moving image mode" is provided to the I/F 80 shown in FIG. 3. When the I/F 80 returns an interrupt signal in response to this mode setting, YES is determined in a step S5 and one frame of interpolated image data is obtained from the I/F 80 in a step S7. In a step S9, the obtained interpolated image data is transferred to the VRAM 38. In a step S11, the presence or absence of an operation of the release key 36a is determined. If NO, the process returns to the step S3. Thus, unless the release key 36a is pressed, a plurality of consecutive frames of interpolated image data are fetched from the I/F 80 and transferred to the VRAM 38.

The plurality of frames of interpolated image data transferred to the VRAM 38 are sequentially read out by the LCD driver 40. As a result, a moving image composed of the plurality of frames of interpolated image data, that is, a through image of the object is displayed on the LCD 42.

When the release key 36a is operated, the process moves from a step S11 to a step S13. In the step S13, an image compression mode is set to the I/F 80 so as to perform the image compression/save process. When the I/F 80 returns an interrupt signal in response to this mode setting, YES is determined in a step S15. Then, the compressed still image data is obtained from the I/F 80 in a step S17, and the compressed still image data is transferred to the work memory 32. The obtained compressed still image data is image data of the object as of a time when the release key 36a is operated. By the process of the step S19, the compressed still image data is temporarily saved in the work memory 32.

When storing of the compressed still image data has been completed, an image decompression mode is set to the I/F 80 in a step S21 so as to perform a decompressed image output process. When the I/F 80 returns an interrupt signal in response to this mode setting, YES is determined in a step S23. Then, the decompressed still image data is obtained from the I/F 80 in a step S25, and the decompressed still image data is transferred to the VRAM 38 in a step S27. The obtained decompressed still image data is image data in which the above stated compressed still image data is decompressed and its resolution is reduced. By the process of the step S27, the decompressed still image data is written into the VRAM 38. The decompressed still image data stored in the VRAM 38 is read out by the LCD driver 40. Consequently, the still image, that is, the freeze image of the object photographed in response to the operation of the release button 36a, is displayed on the LCD 42.

The presence or absence of an operation of the recording key 36b is determined in a step S29, and the presence or absence of an operation of the cancel key 36c is determined in a step S31. When the recording key 36b is operated, the process goes from the step S29 to a step S33 so as to record the compressed image data saved in the work memory 32 on the flash memory 30 in a file format. Upon completion of this recording process, the process returns to the step S3. On the other hand, when the cancel key 36c is operated, YES is determined in a step S31 and the process returns to the step S3 without passing the recording process. Accordingly, the through image output process is resumed.

Next, referring to FIG. 8 and FIG. 9, a description will be given as to an operation of the camera CPU 82. A prescribed initialization process is carried out in a step S41, and the mode information set by the main CPU 28 is obtained from the I/F 80 in a step S43. It is determined in a step S45 whether or not a content of the mode information indicates "moving image mode", and it is determined in a step S47 whether or not the content of the mode information indicates "image compression mode". If YES is determined in the step S45, the process goes to a step S49 so as to perform the through image output process. If YES is determined in the step S47, the process goes to a step S61 so as to perform the image compression/save process. If NO is determined in either the step S45 or the step S47, the process returns to the step S43.

At the time of the through image output process, the switches SW1 and the SW2 are firstly connected to the terminals S1 and S3 in a step S49. This enables the thinning-out circuit 70. The driver is instructed to perform raster scanning in a step S51, and the memory controller 76 is instructed to perform bank switching in a step S53. In a step S55, it is determined whether or not a vertical synchronizing signal is output from the TG 64. If YES, an interrupt signal is output to the main CPU 28 via the I/F 80 in a step S57. When the operation of the step S57 has been completed, the process returns to the step S43. Therefore, as long as the moving image mode is set to the I/F 80, the process of the steps S49 to S57 is repeatedly performed.

The driver 62 drives the image sensor 54 in a raster-scanning mode in response to the vertical synchronizing signal from the TG 64. Based on the raster scanning, the camera signal processing circuit 58 outputs consecutive frames of interpolated image data. The interpolated image data output from the camera signal processing circuit 58 are subjected by the thinning-out circuit 70 to a thinning-out process. The low-resolution interpolated image data output from the thinning-out circuit 70 is written by the memory controller 76 into the first frame memory 78a or the second frame memory 78b.

Since the bank switching instruction is given, the memory controller 76 switches a writing destination for each one frame between the first frame memory 78a and the second frame memory 78b, and switches a reading destination for each one frame between the second frame memory 78b and the first frame memory 78a. As a consequence, every frame of interpolated image data is alternately written into the first frame memory 78a and the second frame memory 78b, and alternately read out from the second frame memory 78*b* and the first frame memory 78*a*. The read consecutive frames of interpolated image data are output to the main CPU 28 via the I/F 80.

At the time of the image compression/save process, for a start, the switches SW1 and SW2 are connected to the terminals S2 and S4, respectively, in a step S59. In a step S61, the image compression circuit 68 is instructed to perform the compression process. The memory controller 76 is instructed to perform bank fixing in a step S63, and the driver 62 is instructed to carry out block scanning in a step S65.

The driver 62 drives the image sensor 56 in a block-scanning mode for a one-frame period of time. The camera signal processing circuit 60 outputs one frame of interpolated image data based on this block scanning. The output interpolated image data is subjected to color conversion by the color conversion circuit 66 and subjected to JPEG compression by the image compression circuit 68 activated by the compression instruction. This generates one frame of compressed still image data. The generated compressed still image data is written by the memory controller 76 into the first frame memory 78*a*, and then read out by the memory controller 76 from the first frame memory 78*a*. The read compressed still image data is output to the main CPU 28 via the I/F 80.

In a step S67 of FIG. 9, it is determined whether or not the compression process for one frame has been completed by the image compression circuit 68. If YES is determined here, the process moves to a step S69 so as to output an interrupt signal to the main CPU 28 via the I/F 80. When the output of the interrupt signal has been completed, mode information is obtained from the I/F 80 in a step S71, and a content of the mode information is identified in a step S73. Then, if the mode information indicates "image decompression mode", the decompressed image output process is performed in a step S75 and later.

Firstly, the image decompression circuit 74 is instructed to perform the decompression process in a step S75, and the memory controller 76 is instructed to make a setting change in a step S77. By the setting change instruction, the memory controller 76 designates the first frame memory 78*a* as a reading destination and the second frame memory 78*b* as a writing destination. The compressed still image data stored in the first frame memory 78*a* is read out by the memory controller 76, and subjected to JPEG decompression by the image decompression circuit 74 activated by the decompression instruction. The decompressed still image data is subjected to color conversion by the color conversion circuit 72 and thinning-out by the thinning-out circuit 70, and then written by the memory controller 76 into the second frame memory 78*b*.

In a step S79, it is determined whether or not the decompression process of the image decompression circuit 74 has been competed. If YES here, the memory controller 76 is instructed to make a setting change in a step S81. By the setting change instruction, the memory controller 76 designates the second frame memory as a reading destination. Accordingly, the low-resolution decompressed still image data stored in the second frame memory 78*b* is read out by the memory controller 76, and output to the main CPU 28 via the I/F 80. When the process of the step S81 has been completed, an interrupt signal is output to the main CPU 28 via the I/F 80 in a step S83, and then the process returns to the step S43.

As understood from the above descriptions, the mobile communication terminal 200 comprises the camera unit 34 and the main CPU 28. In the camera unit 34, a series of processing systems including the color conversion circuit 66 and the image compression circuit 68 generates high-resolution compressed still image data based on interpolated image data of a photographed object. Also, a series of processing systems including the image decompression circuit 74, the color conversion circuit 72 and the thinning-out circuit 70 generates low-resolution decompressed still image data based on the high-resolution compressed still image data.

The main CPU 28 here activates the image compression circuit 68 upon operation of the release key 36*a*, and activates the image decompression circuit 74 when generation of the compressed still image data has been completed. The low-resolution decompressed still image data generated by activation of the image decompression circuit 74, is obtained by the main CPU 28 from the camera unit 34 and written into the VRAM 38. As a result, the decompressed image is displayed on the LCD 42. This makes it possible to easily and promptly check the decompressed image for any image quality deterioration resulting from the compression process in a lossy format such as JPEG.

Also, the main CPU 28 temporarily saves the compressed still image data generated by the image compression circuit 68 in the work memory 32 and, when the recording key 36*b* is operated, the compressed still image data is recorded on the flash memory 30. Requesting for the operation of the recording key 36*b* in recording data on the flash memory 30 makes it possible to avoid unintended recording of the compressed still image data of insufficient image quality. In this regard, operability will be improved.

Moreover, since the image compression circuit 68 performs the compression process in pixel blocks, the driver 62 drives the image sensor 56 in a block scanning mode. This eliminates the need for temporarily storing in the memory the interpolated image data output from the camera signal processing circuit 60, which allows a reduction in memory capacity.

In addition, although this embodiment is described with the use of a mobile communication terminal, the present invention may be applied to all kinds of electronic apparatuses (preferably, mobile electronic apparatuses) having a camera function.

Furthermore, this embodiment employs a CMOS-type image sensor with consideration given to a reduction in memory capacity. However, a CCD-type image sensor capable of performing only raster scanning may be used if there is no limit to memory capacity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera comprising:
    an image sensor having a light-receiving surface to which a plurality of first pixel blocks are assigned;
    a reading means for reading electrical charges generated on said light-receiving surface from said image sensor by scanning said plurality of first pixel blocks in a specific order;
    a generation means for generating image data for each second pixel block corresponding to the first pixel block based on the electrical charges read by said reading means;
    a compression means for compressing the image data generated by said generation means for each second pixel block in said specific order;
    a decompression means for decompressing the compressed image data generated by said compression means for each second pixel block in said specific order;

an output means for outputting the decompressed image data generated by said decompression; and a color filter that has a plurality of color elements covering a plurality of pixels formed on said light-receiving surface, respectively, wherein electrical charges generated in each of said plurality of pixels have color information of one of a plurality of colors, a pixel forming the image data generated by said generation means has all of said plurality of colors, the second pixel block is larger than the first pixel block, and two second pixel blocks adjacent to each other are partly overlapping.

2. An electronic camera according to claim 1, further comprising:

a first activation means for activating said compression means in response to a photographing instruction; and a second activation means for activating said decompression means in response to completion of a compression process by said compression means.

3. An electronic camera according to claim 1, further comprising:

a storage means for temporarily storing in a memory the compressed image data generated by said compression means; and a recording means for recording on a recording medium the compressed image data stored in said memory in response to a recording instruction.

4. An electronic camera according to claim 1, wherein said image sensor is a CMOS type.

5. An electronic camera according to claim 1, wherein said output means includes a resolution reduction means for reducing a resolution of the decompressed image data.

6. An electronic camera according to claim 1, wherein said compression means performs compression in a lossy format.

7. An electronic camera according to claim 1, wherein the image data is still image data.

* * * * *